United States Patent

Hinterlechner

[11] Patent Number: 5,927,453
[45] Date of Patent: *Jul. 27, 1999

[54] DEVICE FOR OVERLOAD PROTECTION AND BRAKING OF A MACHINE PART DRIVEN BY A MOTOR

[75] Inventor: Gerhard Hinterlechner, Pforzheim, Germany

[73] Assignee: Micron Technology, Inc., Boise, Id.

[*] Notice: This patent is subject to a terminal disclaimer.

[21] Appl. No.: 08/977,309

[22] Filed: Nov. 24, 1997

Related U.S. Application Data

[63] Continuation of application No. 08/714,806, Sep. 17, 1996, Pat. No. 5,868,229, which is a continuation of application No. PCT/EP92/01544, Jul. 9, 1992.

[30] Foreign Application Priority Data

Jul. 17, 1991 [DE] Germany .............................. 41 23 681

[51] Int. Cl.⁶ ............................ B60K 41/24; F16D 67/02
[52] U.S. Cl. .................................. 192/12 R; 192/48.92; 192/56.54; 192/56.62
[58] Field of Search ................................. 192/12 R, 12 B, 192/48.92, 56.53, 56.54, 56.62, 145

[56] References Cited

U.S. PATENT DOCUMENTS

| 1,613,991 | 1/1927 | Giannattasio . |
| 1,865,129 | 6/1932 | Menhall . |
| 4,022,307 | 5/1977 | Berrie et al. . |

FOREIGN PATENT DOCUMENTS

| 0 205 989 | 12/1986 | European Pat. Off. . |
| 27 14 452 | 10/1977 | Germany . |

*Primary Examiner*—Charles A. Marmor
*Assistant Examiner*—Saúl J. Rodríguez
*Attorney, Agent, or Firm*—Trask, Britt & Rossa

[57] ABSTRACT

A device for overload protection and for braking a machine part driven by a motor (2), in particular, a tool driven by a cam gear in a stamping and/or bending machine, comprises a module (3), an overload clutch (4) disengaging after exceeding a torque threshold, and a freewheel (6) which, during the braking of the drive shaft (1), blocks in the direction of drive, each being arranged on the drive shaft (1) behind one another in the drive line extending from the motor (2) to the machine part.

19 Claims, 3 Drawing Sheets

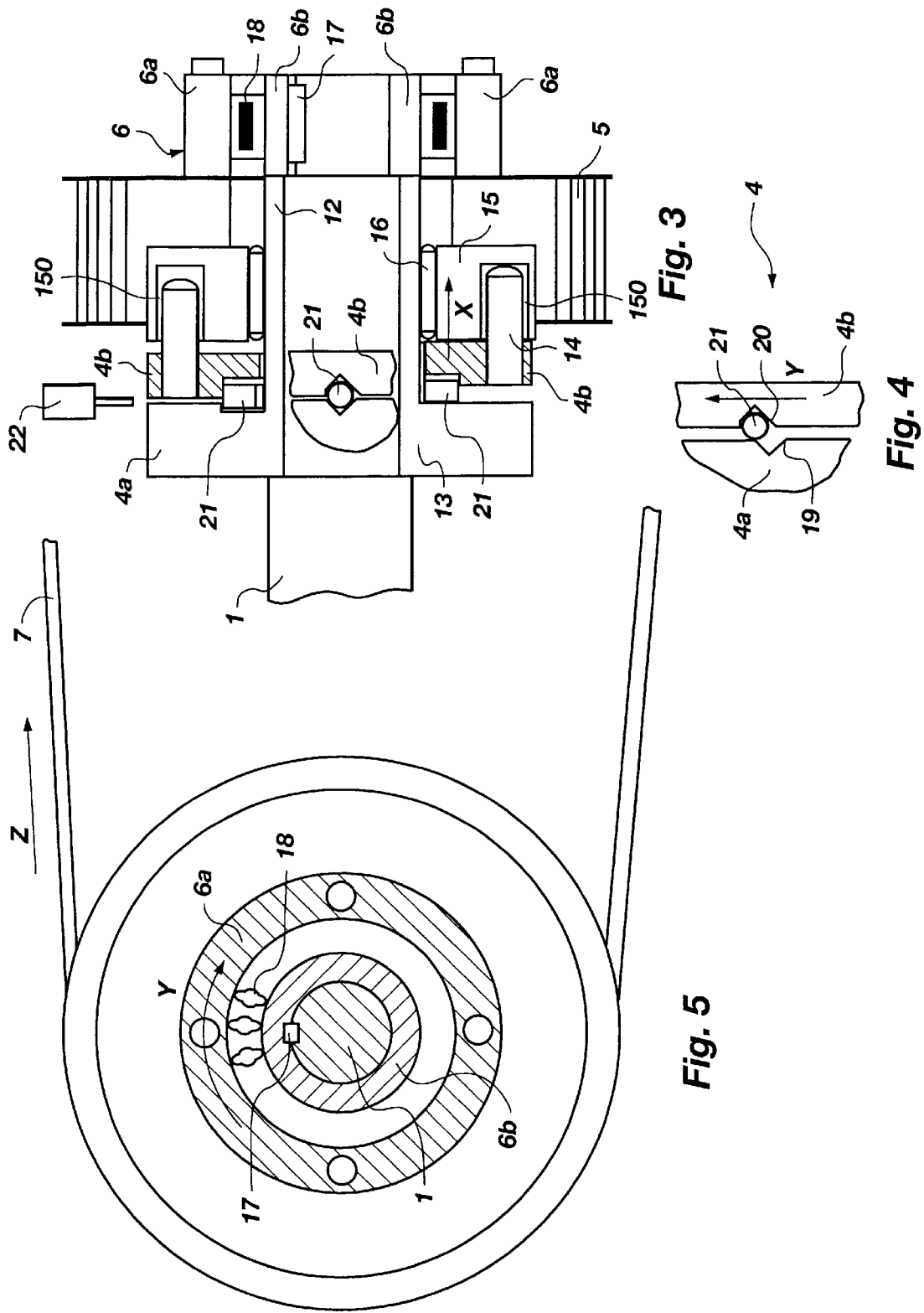

DEVICE FOR OVERLOAD PROTECTION AND BRAKING OF A MACHINE PART DRIVEN BY A MOTOR This is a continuation of application Ser. No. 08/714,806, filed Sep. 17, 1996, now U.S. Pat. No. 5,868,229, which is a continuation of international application PCT/EP92/01544, filed one Jul. 9, 1992, which entered the national stage and was assigned application number 08/211,562. It issued as U.S. Pat. No. 5,555,962 on Sep. 17, 1996. The patent was assigned a date of Jan. 17, 1994, under 35 U.S.C. §371 and 35 U.S.C. §102(e). This application also claims benefit under 35 U.S.C. §119 to German application number P4123681.5, filed on Jul. 17, 1991.

BACKGROUND OF THE INVENTION

The invention relates to a rapid-response braking device for braking a machine driven part.

One of the problems in high-speed stamping and bending machines consists of preventing or limiting, as far as possible, damage to the tool in the event of an excessive load which is placed on the tool. Thus it is known to use an overload clutch which separates the drive line of the motor from the tool if the scheduled load is exceeded (torque) or, with respect to a slipping clutch, which limits the torque transmitted by the drive shaft. Because of the momentum which the masses behind the overload clutch have, they continue to rotate when the overload clutch responds, even if it completely releases the masses from the motor in the drive line. The problem to be solved therefore consists of braking the continuously moving masses as quickly as possible so as to prevent them from causing any major damage. If a brake is provided between the motor and the overload clutch, the brake may brake and stop the motor, but not the section of the drive line which is released by the overload clutch and which connects with the tool. However, if a brake is-provided behind the overload clutch, it is possible to brake the tool until it comes to a standstill and thus prevent damage, provided that the brake is fast enough. Unfortunately, the masses that have to be braked in the drive line behind the overload clutch (tools and gears) are generally larger than the masses which lie in the section of the drive line in front of the overload clutch. A brake provided in the drive line behind the overload clutch must therefore be provided with a respectively strong design, which has an adverse effect on the braking times. The braking time is made up of an excitation time which is characteristic for the design of the respective brake and of the pure braking time for dissipating the kinetic energy. Pneumatic and hydraulic brakes require higher excitation periods for driving valves and for building up the required pressure in the braking device than electromagnetic brakes. However, they can provide large braking moments. Fast control devices such as electromagnetic brakes allow for a very short excitation time of the brake coil, but provide a longer braking time. A short braking time is of importance in stamping and bending machines and, in particular, in machines for trimming and forming the legs of integrated circuits (IC) in which the tool is driven by a cam gear, i.e., the forward and backward movement is determined by a roller which rolls on the cam surface of an eccentric disk. A rotation of the eccentric disk is equivalent to one work cycle of the machine in which the tool is positioned, the position being controlled such that the tool is advanced for processing the workpiece (working stroke) and then retracted (idle stroke), and the workpiece is advanced or removed. It is known from experience that the control of the tool movement requires about half a turn of the eccentric disk. Thus, only half of a turn of the eccentric disk is available for conveying the workpiece, for positioning the workpiece, for controlling measurement for ensuring that the tool position is correct and for a possible switch-off of the machine if the workpiece position is incorrect. The extension or shortening of the brake angle thus finds entrance into the cycle time of the machine with a factor of up to 2, i.e., the extension of the brake time causes a considerable extension of the cycle time. In order to obtain high-speed machines, it is therefore decisive that the workpiece can be stopped very quickly so as to prevent the destruction of the tool in the event of a wrongly positioned workpiece. Until recently, this problem was addressed by improving the efficiency of the brakes, reducing the response times and placing the brake as closely as possible to the position to be protected at the end of the drive line. These measures were implemented so as to provide a reduction of the maximum occurring moment that is caused by the released mass moment of inertia. These attempts, however, are subject to certain limits, because high braking moments are required through larger braking devices whenever high mass moments of inertia are present.

BRIEF SUMMARY OF THE INVENTION

The invention is directed to a device for braking a motor drive machine part which can provide a particularly rapid stopping of the driven machine part by intentional braking during malfunctions, and which limits the maximally occurring moment in the event of overload and thus the maximum load peak acting on the tools.

In accordance with the present invention, there is provided in the drive line, between the motor and the driven machine part, a combination of a brake, an overload clutch and a freewheel which runs freely during the driving of the machine part, but which blocks during the braking of the driven machine part. The brake in the drive line is disposed in front of the overload clutch and the freewheel is disposed behind the overload clutch.

If the brake operator initiated or operated by a sensor which reports that a workpiece on which the driven machine part (tool) is to act is not positioned correctly, the momentum of all moving masses at first acts on the brake and the torque threshold is reached very quickly by the braking process, whereupon the overload clutch responds. At this time, the brake does not have to brake the masses disposed behind the overload clutch for the short period until the blocking of the freewheel occurs. It only has to block a very small mass, so that the brake comes to a standstill very rapidly. The response of the overload clutch does, however, not lead to the situation that the released machine part can continue to move unhindered, because the freewheel now automatically takes affect. After passing its clamping angle, which should be very small, the freewheel blocks and receives the remaining momentum of the driven machine part (tool) that is to be braked. It then passes the momentum into the brake which, because it is now static, dissipates the energy practically instantaneously. The holding momentum of the brake is so high that it is not necessary to put the drive shaft into motion again. Here the blocking direction of the freewheel is equivalent to the driving direction.

If the brakes are not intentionally activated and there is an excessive load in the drive line such that the torque threshold of the overload clutch is exceeded, the freewheel responds. In accordance with the invention, this can be used to release the braking device. The braking device can stop the drive shaft very rapidly because the freewheel does not initially block at first, and thus the momentum of the moving masses behind the overload clutch is not stopped, but the momentum in front of the overload clutch is caught and requires braking. Therefore, it is possible to provide the brake with a relatively compact design, i.e., with a small end brake coil, additionally in contributing to a short braking period. The mass to be braked during this phase is particularly small if a clutch for decoupling the motor is provided between the brake and the motor. In this case, the brake does not have to also brake the flywheel mass of the motor in the event of a response by the overload clutch. Preferably, the additional clutch is provided in the form of a clutch-brake combination, i.e., a component consisting of clutch and brake, which provides a minimum of masses to be braked by using a compact design. Because the mass to be braked by the brake is very small, it comes to a standstill very quickly. The braking of the freewheel also occurs very rapidly. The blocking freewheel collects the remaining momentum of the masses in the drive line behind the overload clutch (tool side) like a buffer and transmits the energy into the already static brake. The holding moment of the brake is so large that the drive shaft does not start to move again.

The braking device in accordance with the present invention is particularly suitable for high-speed bending and stamping machines, in particular such machines in which tools are mechanically driven by cam gears and in which the moved masses and the braking moments required for their stopping are not too high.

If a reduction gear is provided between the drive part of the overload clutch and the machine part to be braked or an intermediate cam gear, it has the advantage that the clamping angle of the freewheel which leads to the standstill of the machine part is respectively reduced by the reduction caused by the reduction gear on the side of the machine part. This leads to a very small brake angle of the eccentric disk. Furthermore, the mass cam gear moment of inertia to be braked with respect to the overload clutch and the brake is reduced, by a factor of two of the reduction. For this reason, a gear may be provided, in the preferred embodiment of the invention, between the overload clutch and the brake.

In order to initiate the braking process during the response of the overload clutch in the event of an overload, a sensor is preferably provided for monitoring the relative position of the two halves of the overload clutch and for supplying a brake signal to the braking device as soon as the beginning of the relative movement of the overload clutch halves is observed. This allows response to an overload without virtually any delay and without any substantial increase of the moment exceeding the set response moment of the overload clutch. Thus, a rapid stop can be realized.

Suitable sensors are primarily light activated, which allow observing changes in positions within the magnitude of fractions of millimeters.

It is, however, also possible to use a torque sensor disposed somewhere within the drive line for initiating the braking process in the event of overload, or a power sensor in the driven machine part.

An electromagnetic brake can be used as the brake. The electromagnet of the brake is supplied with a high current for a short period when the brake is initiated. The drive motor is also decoupled if the clutch-brake combination is used and when it is, it is not necessary to brake the motor.

A preferable alternative embodiment consists of providing a servomotor as the motor for driving the machine part possibly requiring braking. The servomotor is controlled directly and therefore can be stopped very quickly. Such a servomotor can assume the task of driving and braking, so a special brake is no longer required.

A very suitable overload clutch is a positive clutch which disengages when the torque threshold is exceeded. The positive clutch comprises a part that is non-rotatable towards the drive shaft (drive part) and a part which is rotatably and disengagingly arranged on the drive shaft (disengaging part). Such a positive clutch disengages after reaching a predetermined torque threshold, thereby allowing the residual momentum energy contained in the drive shaft behind the positive clutch, which, in turn, is collected by the blocking freewheel and is transmitted to the brake which, in the meantime, has come to a standstill. Such a positive clutch responds very quickly. Its response threshold is usually determined by a spring with which the two clutch halves are pressed against each other. Preferably, a spring with variable spring rate characteristics is used in the positive clutch. Thus, at the initial response, the torque, which can be transmitted by the clutch, drops to a very small residual moment. The use of a spring with varying spring rate characteristics contributes to the rapid response of the positive clutch.

Slip clutches, which are commonly used as overload clutches, are less suitable, because they have a slower response and transmit thereafter a higher residual moment. A freewheel usually comprises two ring surfaces which are relatively moveable towards each other. Clamp bodies are disposed between the two ring surfaces, which clamp bodies allow freewheeling in one direction of rotation and clamping in the other direction of rotation. One of the ring surfaces could be arranged directly on the drive shaft. Preferably, one ring is rigidly attached to the drive shaft and the other is rigidly attached to the disengaging part of the overload clutch. The blocking direction of the freewheel is equivalent to the driving direction.

BRIEF DESCRIPTION OF THE DRAWINGS

The enclosed schematic drawings show an embodiment of the invention.

FIG. 3 details a positive clutch in combination with a freewheel clutch as a component of the drive unit represented in FIG. 1;

FIG. 4 shows in detail the positive clutch of FIG. 3 in the disengaged position;

FIG. 5 shows an end view in partial cross section through the freewheel clutch in accordance with FIG. 3;

DETAILED DESCRIPTION OF THE PREFERRED EMBODIMENT

Figure 1:
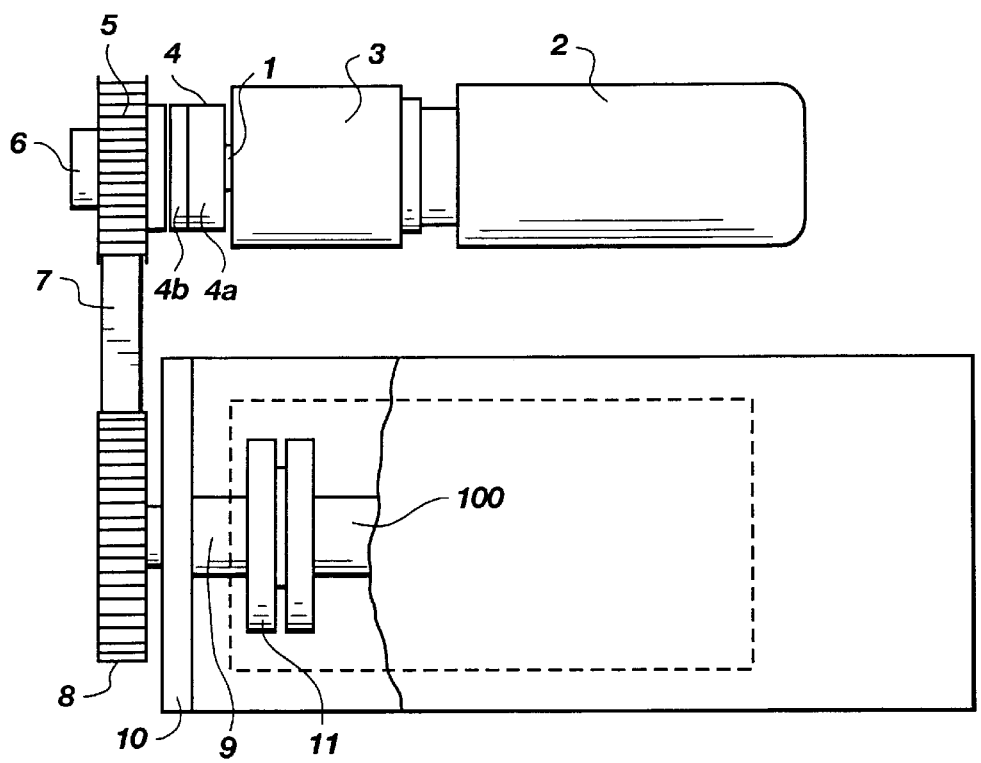
FIG. 1 shows a top view of a drive unit of a machine.

The drive unit of FIG. 1 comprises, on a drive shaft 1 and disposed behind one another, an electromotor 2, a module 3 comprising an electromagnetic brake and a clutch for decoupling the electromotor 2, a positive clutch 4 provided as an overload clutch which disengages whenever the torque threshold is exceeded, a toothed wheel 5 and a freewheel 6 (a one-way clutch with a ratchet brake). The driving toothed wheel 5 drives a further toothed wheel 8 by means of a toothed belt 7, which wheel 8 is situated on a driven shaft 9 held in a gear casing 10 and carrying in the gear casing several eccentric disks 11 connected to a drive machine tool 100.

As shown in FIG. 3, positive clutch 4 comprises a drive part 4a consisting of a driving collar 12 and a flange 13 and being axially non-displaceable and torsionally rigidly connected with shaft 1. Positive clutch 4 further comprises a disengaging part 4b which encases driving collar 12 in an axially displaceable manner and which is rotatable towards said collar. For this purpose, several paraxial bolts 14 are disposed in the disengaging part 4b, which bolts extend into the bores 150 of a bearing ring 15 which is rotatably held on driving collar 12 by means of rolls 16. The bearing ring 15 is torsionally rigidly connected to toothed wheel 5, which wheel is torsionally rigidly connected with the outer ring 6a of the freewheel 6. The inner ring 6b of the freewheel 6 is torsionally rigidly connected with the drive shaft 1 by means of a wedge 17. Between the outer ring 6a and the inner ring 6b, pawls 18 are provided in the freewheel 6 in such a way that the freewheel operates freely in one direction while toothed wheel 5 is driven, whereas, in the opposite direction, pawls 18 block freewheel rotation if shaft 1 is braked and positive clutch 4 is disengaged.

As shown in FIG. 4, in the surfaces of the drive part 4a and the disengaging part 4b of the positive clutch 4, there are notches 19 and 20 which are provided opposite of one another and which extend radially and are used to receive rollers 21 which keep the drive part 4a and the disengaging part 4b at a small distance from one another. By means of springs (not shown) acting between the disengaging part 4b and the bearing ring 15 the disengaging part 46 is permanently pressed against the drive part 4a. The spring force, the diameter of the rollers 21 and the form of notches 19 and 20 determine the torque threshold beyond which the drive part 4a and the disengaging part 4b begin to rotate against one another, whereby the disengaging part 4b moves away from the drive part 4a and bolts 14 move deeper into bearing ring 15 (see also FIGS. 3 and 4). To observe the disengaging movement of the positive clutch 4, a sensor 22 (FIG. 3), in particular, a light barrier or the like, is provided. Said sensor is sensitive to the relative movement of the disengaging part 4b towards the drive part 4a and transmits thereafter a signal to module 3 via a very rapid electric connection, which brake is thus initiated.

Figure 6:
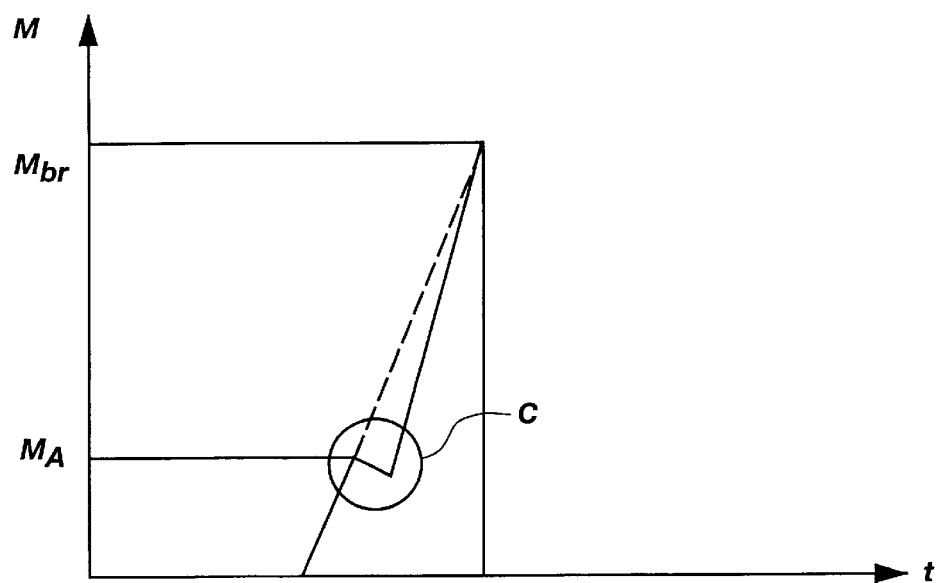
FIG. 6 shows torque-time characteristics of an intentionally initiated braking process.

In a properly working machine, electromotor 2 drives the drive shaft 1 and, with said shaft, the drive part 4a of the positive clutch which is engaged and entrains the toothed wheel 5. If the module 3 is initiated without an overload occurring in the drive unit, either intendedly or by a sensor which notices that a workpiece in the processing area of a driven tool is not positioned correctly, the drive shaft 1 plus all masses still connected therewith, with the electromotor 2 being decoupled, are braked from the positive clutch 4 over driven shaft 9, and eccentric disks 11 up to the tool, thus also the drive part 4a of the positive clutch 4 and the inner ring 6b of the freewheel clutch 6. The torque acting on the module 3 and the positive clutch 4 rises rapidly until the torque threshold $M_A$ is reached, at which point the positive clutch 4 disengages (see FIG. 6). During the disengaging movement, there is a temporary decline in the torque acting on module 3 (area C in FIG. 6) because the masses in the drive line behind the positive clutch 4 are decoupled by the module 3 and the drive shaft 1 comes to a standstill. During the disengaging movement, the rollers 21 move out of notches 19, 20 whereby the disengaging part 4b turns with respect to the drive part 4a (direction of movement Y in accordance with FIG. 4). At the same time, the clamping movement of the freewheel 6 begins, because the disengaging part 4b and the inner ring 6b are no longer driven by drive shaft 1 and drive shaft 1 comes to a standstill. Now toothed wheel 8 and driven shaft 9, via toothed belt 7 and the toothed wheel 5, drive the outer ring 6a of the freewheel 6 with their momentum until the freewheel blocks, i.e., brakes, the momentum instantaneously and thus receives the occurring braking moment which rises steeply to the final value $M_{br}$ and thus rapidly stops the rotational movement of toothed wheel 5 and the movement of all machine parts driven thereafter, because the freewheel 6 is held by the module 3 which has come to a standstill in the meantime.

Figure 2:
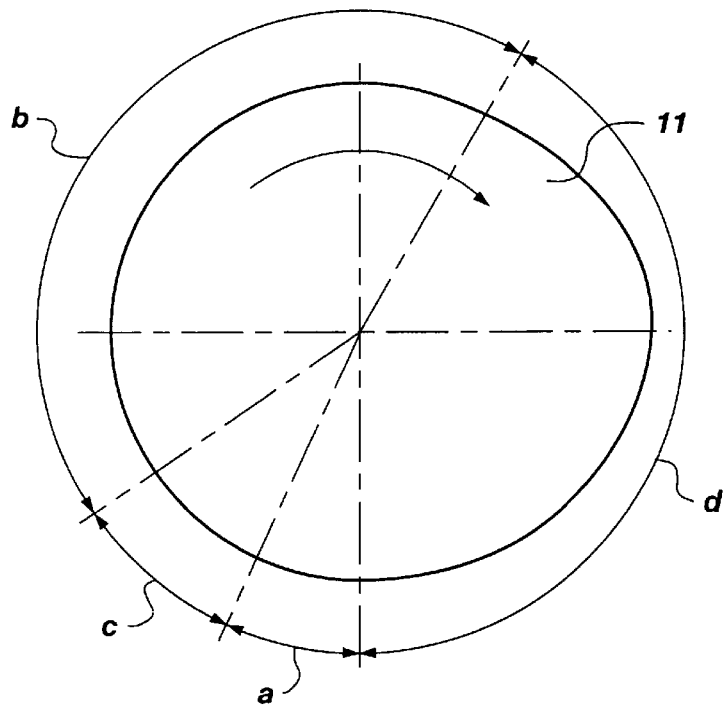
FIG. 2 shows a side view of an eccentric disk of the drive unit shown in FIG. 1.

The setting of the positive clutch according to the required drive moments of the driven machine parts (tools) has no influence on the disengaging behavior of the positive clutch and thus on the maximum clamping angle of the freewheel. The already very small clamping angle of the freewheel 6 is reduced even further according to the reduction ratio of the toothed belt gear. This leads to a very small brake angle (a) in eccentric disk 11 (see FIG. 2). As nearly half of the circumferential angle of the eccentric disk is needed for the tool movement (section d) and approximately the same circumferential section is required for the advancement or the insertion of the workpiece, there remains only a relatively small circumferential section (c) for fixing the tool and for controlling measurements of its position and also only a very small circumferential section (a) for the braking process which has to be initiated in the event of an established incorrect positioning. As the extension of the brake time finds entrance into the cycle time (time used for one rotation of the eccentric disk 11) with a factor of 2, it is preferable that, by using the invention, the circumferential section (a) required for the braking is kept very small.

Figure 7:
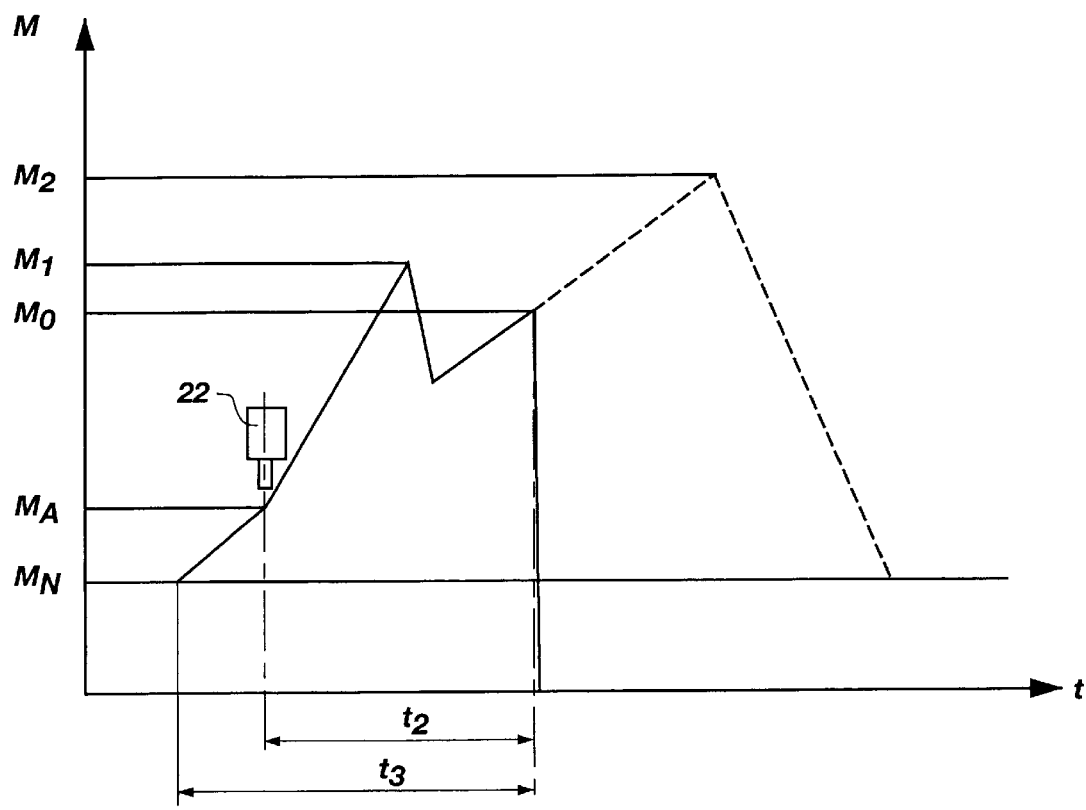
FIG. 7 shows torque-time characteristics in the event of an overload.

If an overload occurs in the driven machine part such as, for example, in a tool which might require braking and which is driven by the eccentric disks 11, freewheel 6 remains unlocked at first, behind in the freewheel direction, and the positive clutch can disengage towards the drive direction Z (FIG. 5), whereby the disengaging movement commences after reaching the torque threshold $M_A$ (FIG. 7). The arising torque maximum $M_1$ is released by positive clutch 4 and the disengaging movement of the positive clutch 4 ends after reaching the torque maximum $M_1$. As the positive clutch is disposed far behind module 3 in the drive line, $M_1$ is relatively small, so that the position of damage in the tool is subjected to a relatively small load. The module 3 is situated at the position of the smallest reduced mass moment of inertia.

The disengagement of the positive clutch 4 leads to the release of the gear members 5, 7, 8, 9, 11 which follow the positive clutch 4 and their kinetic energy still needs collecting and dissipating. For this purpose, a sensor 22 is provided which initiates the module 3 at the beginning of the disengaging process during the lift-off of disengaging part 4b.

During the disengagement of the positive clutch 4, the brake device only has to brake very small mass moments of inertia, i.e., those of the drive shaft 1, the drive part 4a of the positive clutch 4 and the inner ring 6b of the freewheel 6. The remaining mass moments of inertia of the toothed belt transmission 5, 7, 8 and the driven shaft 9, and eccentric disks 11, which are situated in the drive line behind the outer ring 6a of the freewheel 6, are slightly delayed and, after the drive shaft 1 has come to a standstill, received by freewheel 6 as soon as it blocks. Within an extremely short brake time $t_2$ after the response of the sensor 22, the stopping of the drive shaft 1 occurs and thereafter the blocking of the freewheel 6 leads to the standstill of the tool. This leads to the fact that the torque maximum $M_2$, which would come about due to the energy of rotation of the gear members following freewheel 6 without the engagement of the braking device and which would lead to damage in the tool, is limited to an uncritical maximum $M_0$ and its action time $t_3$, at the position of damage in the tool, is shortened. After time $t_3$, the tool comes to a standstill.

For example, if desired, between the module 3 consisting of clutch and brake and the positive clutch 4, there may be provided a gear which reduces the mass moment of inertia to be braked, by a factor of twice the gear reduction ratio. This, however, requires that a higher speed of the motor has to be accepted.

What is claimed is:

1. A device for the overload protection and for the braking of a machine part in a machine having a workpiece located therein, the device having a drive shaft in a drive line driven by a motor on which an overload clutch is disposed, the drive line extending from the motor to the workpiece, said device comprising:

braking apparatus connected to the drive shaft on a first side of the overload clutch; and freewheel apparatus located on a second side of the overload clutch, the freewheel apparatus connected to the overload clutch preventing rotation of the drive shaft in less than a portion of a rotation thereof during the braking of said machine part for said overload protection thereof.

2. The device as claimed in claim 1, wherein the braking apparatus includes a servomotor.

3. The device as claimed in claim 1, further comprising:

a sensor for sensing an overload occurring in the drive line extending from the motor to the workpiece and for providing a signal to the braking apparatus.

4. The device as claimed in claim 3, wherein the overload clutch comprises:

a first drive part and a second disengaging part; and the sensor responds to a relative movement of the first drive part and the second disengaging part of the overload clutch.

5. The device as claimed in claim 1, wherein the braking apparatus comprises:

a brake and a clutch located between the motor and the overload clutch.

6. The device as claimed in claim 1, wherein the overload clutch comprises:

a positive overload clutch which disengages after exceeding a predetermined torque threshold, the positive overload clutch having a first drive part being non-rotatable with respect to the drive shaft and a second disengagable part being disengagable and rotatably arranged on the drive shaft.

7. The device as claimed in claim 6, wherein the first drive part (4b) and the second disengaging part (4b) of the positive overload clutch are resiliently connected by means of a resilient member having a variable spring rate characteristic.

8. The device as claimed in claim 6, wherein the freewheel apparatus has a first ring, which is, in turn, torsionally connected to the drive shaft, and a second ring (6a), which is, in turn, torsionally connected with the disengageable part of the positive overload clutch.

9. The device as claimed in claim 1, further comprising:

a sensor for sensing an incorrect position of the workpiece located in the machine.

10. The device as claimed in claim 1, wherein the braking apparatus in the drive line is connected to the drive line at a position where a smallest reduced mass moment of inertial of any portion of the drive line is located.

11. The device as claimed in claim 1, wherein the braking apparatus comprises:

a brake and a clutch, each located between the motor and the overload clutch.

12. A device for the overload protection and for the braking of a machine part in a machine having a workpiece located therein, the device having a drive shaft driven by a motor on which an overload clutch is disposed, said device comprising:

braking apparatus connected to the drive shaft on a first side of the overload clutch; and freewheel apparatus located on a second side of the overload clutch, the freewheel apparatus connected to the overload clutch preventing rotation of the drive shaft in less than a portion of a rotation thereof during the braking of said machine part for said overload protection thereof, the freewheel apparatus including:

a first ring connected to the drive shaft;

a second ring torsionally connected to a portion of the braking apparatus.

13. The device as claimed in claim 12, wherein the braking apparatus includes a servomotor.

14. The device as claimed in claim 12, further comprising:

a sensor responsive to an overload occurring in a connection from the motor to the machine part, the sensor providing a signal to the braking apparatus when an overload occurs.

15. The device as claimed in claim 14, wherein the overload clutch comprises:

a first drive part and a second disengaging part.

16. The device as claimed in claim 12, wherein the overload clutch comprises:

a positive overload clutch for disengaging after exceeding a predetermined torque threshold, the positive overload clutch having a first drive part being non-rotatable with respect to the drive shaft and a second disengagable part arranged on the drive shaft.

17. The device as claimed in claim 16, wherein the first drive part and the second disengagable part are resiliently connected by a resilient member.

18. The device as claimed in claim 12, comprising:

a sensor sensing an incorrect position of the workpiece located in the machine.

19. The device as claimed in claim 12, wherein the braking apparatus is located at a position where a small mass moment of inertia is located relative to the machine part.

* * * * *

UNITED STATES PATENT AND TRADEMARK OFFICE
CERTIFICATE OF CORRECTION

PATENT NO. : 5,927,453
DATED : July 27, 1999
INVENTOR(S) : Gerhard Hinterlechner It is certified that error appears in the above-identified patent and that said Letters Patent is hereby corrected as shown below:

Column 1, line 8, change "one" to --on--;

Column 1, line 37, change "is-provided" to --is provided--;

Column 5, line 7, change "shaft 1." to --drive shaft 1.--;

Column 5, line 31, change "46" to --4b--;

Column 5, line 47, after "positive clutch" insert --4--;

Column 5, line 49, delete "intendedly" and insert --intentionally-- therefor;

Column 5, line 65, after "19," insert --and 20--;

Claim 7, Column 7, line 54, delete "(4b)" (both occurrences);

Claim 8, Column 8, line 1, delete "(6a)"; and

Claim 10, Column 8, line 9, change "inertial" to --inertia--.

Signed and Sealed this

Twenty-second Day of May, 2001

Attest:

NICHOLAS P. GODICI

Attesting Officer      Acting Director of the United States Patent and Trademark Office